US009628972B2

(12) United States Patent
Gerdes

(10) Patent No.: US 9,628,972 B2
(45) Date of Patent: Apr. 18, 2017

(54) EMERGENCY COMMUNICATIONS SYSTEM

(71) Applicant: Harman Becker Automotive Systems GmbH, Karlsbad (DE)

(72) Inventor: Thomas Gerdes, Ulm (DE)

(73) Assignee: Harman International Industries, Incorporated, Stamford, CT (US)

( * ) Notice: Subject to any disclaimer, the term of this patent is extended or adjusted under 35 U.S.C. 154(b) by 195 days.

(21) Appl. No.: 13/863,214

(22) Filed: Apr. 15, 2013

(65) Prior Publication Data

US 2013/0273873 A1    Oct. 17, 2013

(30) Foreign Application Priority Data

Apr. 17, 2012 (EP) ..................................... 12002676

(51) Int. Cl.
| | | |
|---|---|---|
| G08B 25/01 | (2006.01) | |
| G08B 29/18 | (2006.01) | |
| G08G 1/00 | (2006.01) | |
| H04W 4/22 | (2009.01) | |

(52) U.S. Cl.
CPC ............ H04W 4/22 (2013.01); G08B 25/016 (2013.01); G08B 29/181 (2013.01); G08G 1/205 (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,367,243 | A | * | 11/1994 | Wells | .................... H01M 2/305 320/105 |
| 5,439,759 | A | * | 8/1995 | Lippert et al. | ................... 429/65 |
| 6,636,732 | B1 | * | 10/2003 | Boling et al. | ............... 455/404.1 |
| 2002/0037707 | A1 | | 3/2002 | Yoshioka et al. | |
| 2002/0195995 | A1 | * | 12/2002 | Cook et al. | .................... 320/117 |
| 2010/0267358 | A1 | * | 10/2010 | Stahlin | ................... G08G 1/205 455/404.1 |
| 2011/0156637 | A1 | * | 6/2011 | Thorsell | ................. B60N 3/002 320/108 |

(Continued)

FOREIGN PATENT DOCUMENTS

| | | |
|---|---|---|
| CN | 1133543 A | 10/1996 |
| CN | 101188045 A | 5/2008 |
| CN | 101261761 A | 9/2008 |

(Continued)

OTHER PUBLICATIONS

European Search Report issued in European Application No. 12002676 dated Sep. 3, 2012, 3 pgs.

(Continued)

*Primary Examiner* — Anthony Addy
*Assistant Examiner* — Martin Chang
(74) *Attorney, Agent, or Firm* — McCoy Russell LLP

(57) ABSTRACT

An emergency communications system, such as an automotive emergency communications system, may include a primary battery, such as a starter battery of a vehicle, an emergency communications control unit electrically and mechanically connected to the primary battery, and a mounting device to mount the emergency communications control unit within a close distance of the primary battery. The close distance may be a distance equal or less than ten centimeters, for example.

16 Claims, 4 Drawing Sheets

(56) References Cited

U.S. PATENT DOCUMENTS

| | | | | |
|---|---|---|---|---|
| 2012/0149323 A1* | 6/2012 | Springs et al. | ............ | 455/404.1 |
| 2013/0127611 A1* | 5/2013 | Bernstein et al. | ............ | 340/455 |

FOREIGN PATENT DOCUMENTS

| | | |
|---|---|---|
| DE | 102005021115 A1 | 11/2006 |
| DE | 102009012628 A1 | 9/2010 |
| DE | 102009056233 A1 | 6/2011 |
| JP | 2006270564 A | 10/2006 |
| JP | 3188347 U | 1/2014 |

OTHER PUBLICATIONS

Japan Patent Office, Office Action Issued in Application No. 2013-053162, Nov. 18, 2016, 5 pages. (Submitted with English Translation).

* cited by examiner

EMERGENCY COMMUNICATIONS SYSTEM

BACKGROUND OF THE INVENTION

1. Priority Claim

This application claims the benefit of priority from European Patent Application No. EP12002676.0, filed Apr. 17, 2012, which is incorporated by reference.

2. Technical Field

The present disclosure relates to emergency communications systems, such as emergency call systems. For example, the present disclosure relates to a secure electrical connection of a device for transmitting an emergency call, such as during an accident.

3. Related Art

Large machines, such as vehicles, can be equipped with electronic safety systems that automatically communicate with emergency services when there has been a malfunction or an accident. Even if a machine operator is severely injured or even unconscious, such systems can automatically inform rescue workers of a location of the machine, so that an ambulance, for example, can immediately be informed. For example, in-vehicle emergency call services have been known to save lives and reduce severity of injuries. In Europe, for example, the "eCall service" has been initiated by the European Commission. In the event of a collision, the service can automatically or manually establish an emergency voice call via a cellular network to a local emergency agency.

SUMMARY

During a machine malfunction or an accident, such as an automotive accident, a power supply cable connecting a main battery and an emergency communications device may be disrupted disabling operation of the emergency communications device. A backup system may be one example solution for such an issue. However, there may be undesired costs associated with a backup system. Described herein, is another example solution not dependent on a backup system or backup battery.

An emergency communications system, such as an automotive emergency communications system, may include a primary battery, such as a starter battery of a vehicle, an emergency communications control unit electrically and mechanically connected to the primary battery, and a mounting device to mount the emergency communications control unit within a close distance of the primary battery. The close distance may be a distance equal or less than ten centimeters, for example.

In one example, the mounting device may include channels to hold power supply cables. In another example, the primary battery and the emergency communications control unit may be embedded in or on a substrate. In yet another example, the emergency communications control unit includes an interface to connect to one or more vehicle communications interfaces to transmit emergency communications.

The system may also include one or more sensors configurable to detect a triggering event and send a message to the emergency communications control unit regarding the triggering event. The triggering event may include inflation of an airbag, a determined amount of deceleration, vehicle rollover, and/or a determined temperature increase or decrease within a vehicle, for example.

Positioning of the emergency communications control unit may vary. In an automotive system example, the control unit may be installed in a passenger compartment, such as the glove compartment. It may also be installed in a vehicle cabin or an engine compartment.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
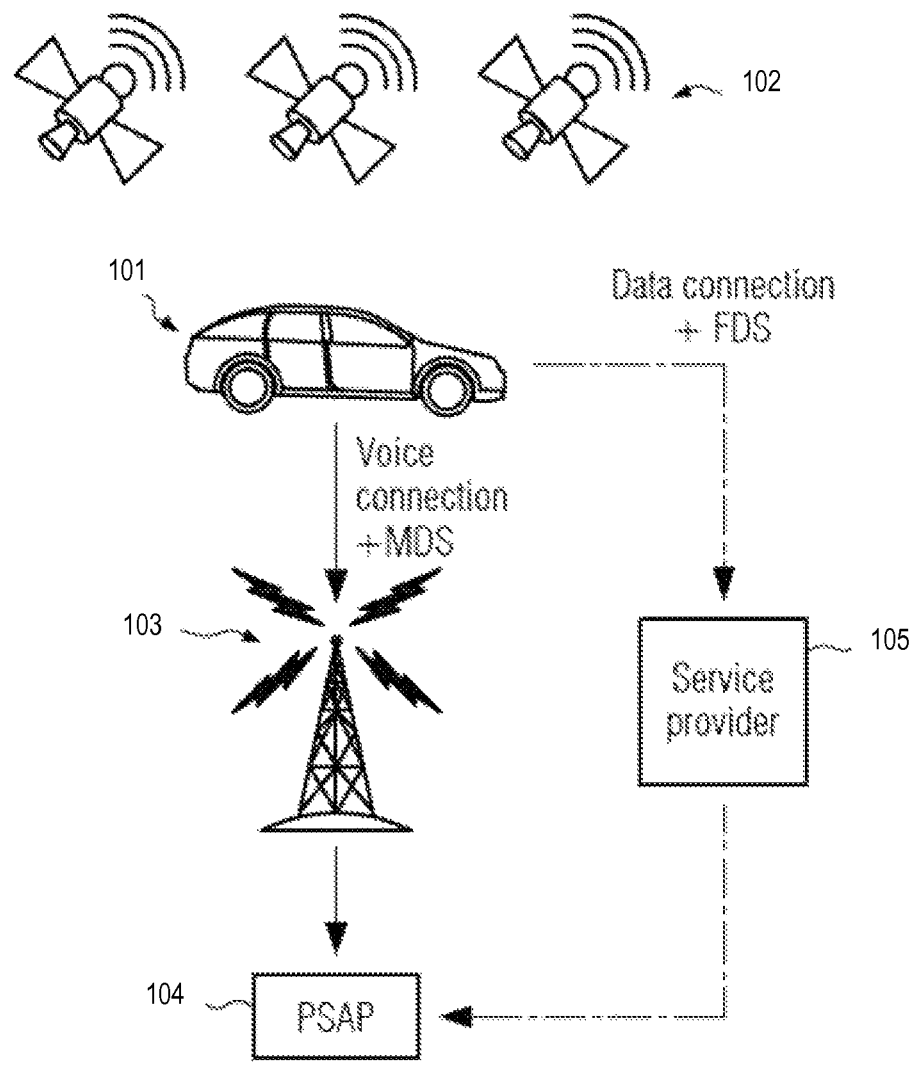
FIG. 1 illustrates an example block diagram including an example emergency communications system architecture.

It is to be understood that the following description of examples of implementations are given only for the purpose of illustration and are not to be taken in a limiting sense. The partitioning of examples in function blocks, modules or units illustrated in the drawings is not to be construed as indicating that these function blocks, modules or units are necessarily implemented as physically separate devices or a single physical device. Functional blocks, modules or units illustrated or described may be implemented as separate devices, circuits, chips, functions, modules, or circuit elements. One or more functional blocks, modules, or units may also be implemented in a common circuit, chip, circuit element or device.

An emergency communications system (ECS), such as an emergency call system and/or an automotive emergency communications system, is described herein.

FIG. 1 illustrates an example block diagram including an example ECS architecture. For example, consider a situation where an automobile 101 is involved in an accident. The automobile 101 may be equipped with GPS for communication with satellites 102 to facilitate satellite positioning. The automobile 101 may also be equipped with an emergency communications control unit that initiates communication, such as a voice communication of a first data set or a minimum data set that may merely include place of an accident, via a network 103.

The first data set may be transmitted in-band over a channel, such as voice channel, to a local emergency agency 104 via the network 103. In addition, a data connection for transmission of a second data set, such as a full data set, may be established via a service provider 105. Whereas the first data set may provide one or more of information on place, time, and type of the accident using a mobile protocol, such as Global System for Mobile Communications (GSM) built-in procedures, more extensive information about a respective machine, such as a vehicle, that may be associated with additional information from another data set provided by the service provider 105. The first data set and the additional data set from the service provider 105 may be transmitted to the local emergency agency 104 in form of a second data set, which may be a full data set. The second data set may be in the XML format and may be transmitted by a machine terminal, such as a vehicle terminal, over a network, such as an Internet Protocol (IP) network not using GSM built-in procedures. The first and the second data set may be in different formats and may be transmitted over different networks and information transmission protocols. In one example, the second data set may be configured for a different GSM format and may be transmitted via a different GSM standard than the first data set.

A back-up battery may not be included for empowering the emergency communications control unit, and power may be supplied from a primary battery, such as starter battery of a vehicle.

Figure 2:
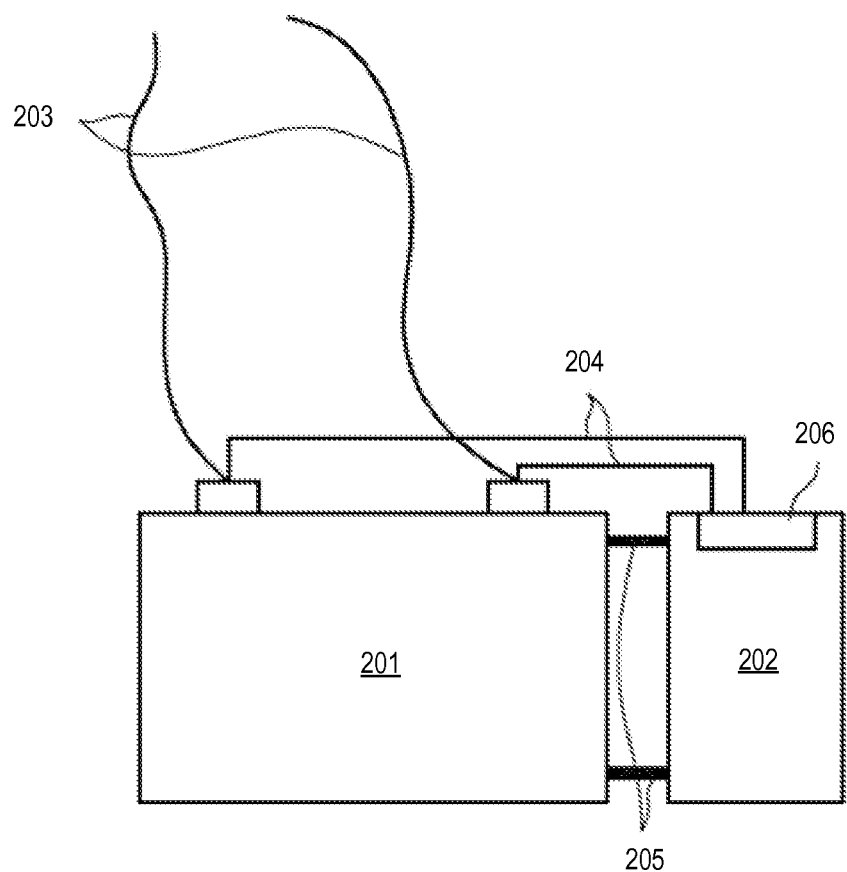
FIG. 2 illustrates an example block diagram including an example emergency communications system.

FIG. 2 illustrates an example block diagram including an example ECS. The system includes a primary battery 201, such as an automotive battery or a SLI battery. The primary battery 201 is a rechargeable battery that can power a motor, such as lead-acid type battery. Also, the primary battery 201 may provide direct current. An emergency communications control unit 202 may be installed in close proximity to the primary battery 201, such as abutting the primary battery 201. As shown in FIG. 2, the emergency communications control unit 202 may be located next to or above the primary battery 201.

The primary battery 201 supplies a plurality of components of an electrical and/or mechanical apparatus, such as a vehicle, via power supply cables 203. For example, the primary battery 201 may supply a machine, such as a vehicle, with electric power via power supply cables 203. The primary battery 201 may supply the emergency communications control unit 202 with power via short power supply cables 204. In one example, closeness of the primary battery 201 and the emergency communications control unit 202 permits the cable lengths for powering the emergency communications control unit 202 to be less than ten centimeters, for example. In other examples, the cable lengths can be less than one meter, half a meter, or twenty centimeters. For example, the cables 204 may be lengths that enable the emergency communications control unit 202 to be within a close distance of the primary battery 201, where the close distance may be less than half a meter, less than 20 centimeters, or less than even ten centimeters. The cables 204 may also be lengths that enable the emergency communications control unit 202 to abut the primary battery 201.

Also depicted is a mounting device 205 for mounting the emergency communications control unit 202 close to the primary battery 201. The mounting device 205 may mechanically and/or electronically connect the emergency communications control unit 202 and the primary battery 201. Moreover, the mounting device 205 may be configured for mounting both the emergency communications control unit 202 and the primary battery 201. The mounting may occur by a fastening device such as one or more screws and/or bolts. The emergency communications control unit 202 may be mounted on movable guiding tracks of the mounting device 205.

As depicted in FIG. 2, the emergency communications control unit 202 includes a system connection device 206 for communication with interfaces other electrical and/or mechanical components, such as other components of a vehicle. Via the system connection device 206 transmission of an emergency communications can be initiated. Also, the emergency communications control unit 202 can be informed about an accident over the system connection device 206 via one or more sensors, such as sensors detecting triggering of inflation of an airbag, a determined amount of deceleration, a vehicle rollover, or a determined temperature increase or decrease within a vehicle.

Figure 3:
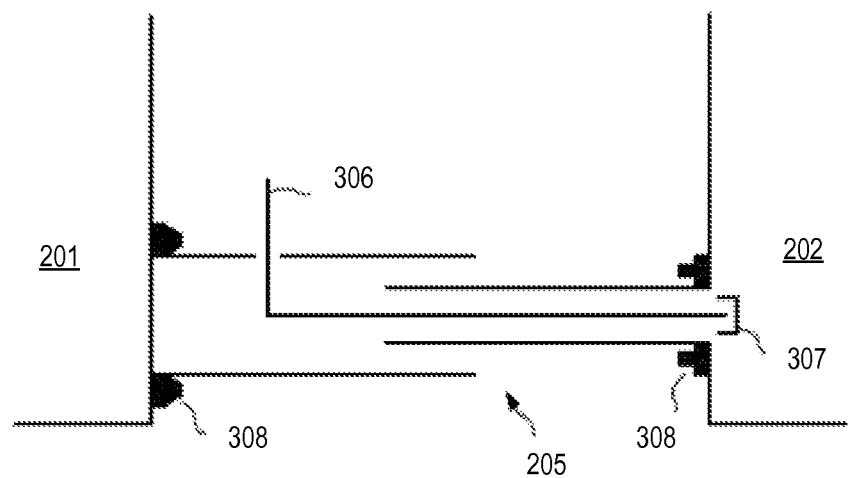
FIG. 3 illustrates an example diagram of a mounting structure for mounting an emergency communications control unit to a battery.

FIG. 3 illustrates an example diagram of a mounting structure for mounting an emergency communications control unit to a battery. The illustrated mounting device 205 includes a structure, such as telescopic structure, for adjustment of the distance between the emergency communications control unit 202 and the primary battery 201. In FIG. 3, a power supply cable 306 is housed in a channel of the structure for adjustment of the mounting device 205. In the emergency communications control unit 202 a socket 307 may be provided for electrical connection to the power supply cable 306.

The adjustment structure of the mounting device 205 may be attached to the primary battery 201 and the emergency communications control unit 202 by a fastening device 308 that may include screws or bolts. In this example, the adjustment structure of the mounting device 205 facilitates adjusting the distance between the primary battery 201 and the emergency communications control unit 202 and may house a power supply cable 306. Such an arrangement may provide protection of a secure electrical connection of the emergency communications control unit 202 to the primary battery 201 even in the case of a large amount of force, such as a force that would occur in a hi-speed vehicle accident.

Figure 4:
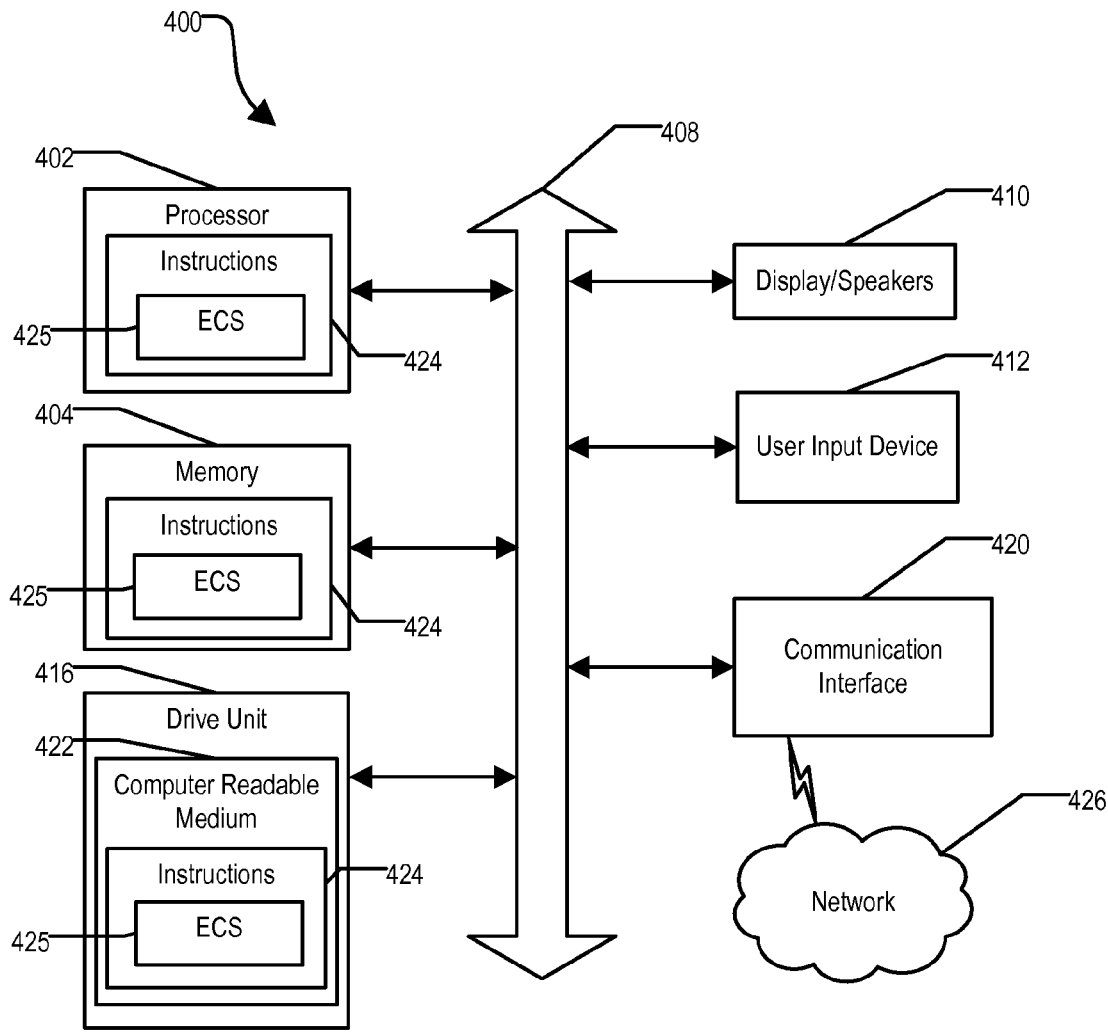
FIG. 4 illustrates an example block diagram of an example computer system that may be included or used with an aspect of an example emergency communications system.

Furthermore, the ECS, one or more aspects of the ECS, or any other device or ECS operating in conjunction with the ECS may include a portion or all of one or more computing devices of various kinds, such as the computer system 400 in FIG. 4. The computer system 400 may include a set of instructions that can be executed to cause the computer system 400 to perform any one or more of the methods or computer based functions disclosed herein, such as such any function provided by emergency communications control unit 202. The computer system 400 may operate as a standalone device or may be connected, such as, using a network, to other computer systems or peripheral devices.

The computer system 400 may be implemented using electronic devices that provide voice, audio, video or data communication. While a single computer system 400 is illustrated, the term "system" may include any collection of systems or sub-systems that individually or jointly execute a set, or multiple sets, of instructions to perform one or more computer functions.

The computer system 400 may include a processor 402, such as a central processing unit (CPU), a graphics processing device (GPU), a digital signal processor, or some combination of different or the same processors. The processor 402 may be a component in a variety of systems. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually or programmed.

The term "module" may be defined to include a plurality of executable modules. The modules may include software, hardware, firmware, or some combination thereof executable by a processor, such as processor 402. Software modules may include instructions stored in memory, such as memory 404, or another memory device, that may be executable by the processor 402 or other processor. Hardware modules may include various devices, components, circuits, gates, circuit boards, and the like that are executable, directed, or controlled for performance by the processor 402.

The computer system 400 may include a memory 404, such as a memory 404 that can communicate via a bus 408. The memory 404 may be a main memory, a static memory, or a dynamic memory. The memory 404 may include a computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 404 includes a cache or random access memory for the processor 402. In alternative examples, the memory 404 may be separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described may be performed by the programmed processor 402 executing the instructions stored in the memory 404. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

A computer readable medium or machine readable medium may include any non-transitory memory device that includes or stores software for use by or in connection with an instruction executable system, apparatus, or device. The machine readable medium may be an electronic, magnetic, optical, electromagnetic, infrared, or semiconductor system, apparatus, or device. Examples may include a portable magnetic or optical disk, a volatile memory such as Random Access Memory "RAM", a read-only memory "ROM", or an Erasable Programmable Read-Only Memory "EPROM" or Flash memory. A machine readable memory may also include a non-transitory tangible medium upon which software is stored. The software may be electronically stored as an image or in another format (such as through an optical scan), then compiled, or interpreted or otherwise processed.

The computer system 400 may be in communication with or include a display device and/or speakers 410. A display device may include a liquid crystal display (LCD) or an organic light emitting diode (OLED) display, for example. The display 410 may act as an interface for the user to see the functioning of the processor 402, or specifically as an interface with the software stored in the memory 404 or in the drive device 416.

The computer system 400 may include an input device 412 configured to allow a user to interact with any of the components of computer system. The input device 412 may be a keypad, a keyboard, or a cursor control device, such as a mouse, or a joystick, touch screen display, remote control or any other device operative to interact with the computer system 400. For example, a user of a navigation system may input criteria or conditions to be considered by a navigation device, such as in calculating a route using the input device 412. Also, the navigation system may provide location of the computer system 400, the user, and or the machine hosting the ECS.

The computer system 400 may include a disk or optical drive device 416. The disk drive device 416 may include a computer-readable medium 422 in which one or more sets of instructions 424 or software can be embedded. The instructions 424 may embody one or more of the methods or logic described herein, including software and/or firmware aspects of the ECS 425. The instructions 424 may reside completely, or partially, within the memory 404 or within the processor 402 during execution by the computer system 400. The memory 404 and the processor 402 also may include computer-readable media as discussed.

The computer system 400 may include computer-readable medium that includes instructions 424 or receives and executes instructions 424 responsive to a propagated signal so that a device connected to a network 426 can communicate voice, video, audio, images or any other data over the network 426. The instructions 424 may be transmitted or received over the network 426 via a communication port or interface 420, or using a bus 408. The communication port or interface 420 may be a part of the processor 402 or may be a separate component. The communication port 420 may be created in software or may be a physical connection in hardware. The communication port 420 may be configured to connect with a network 426, external media, the display 410, or any other components in the computer system 400, or combinations thereof.

The term "computer-readable medium" may include a single storage medium or multiple storage media, such as a centralized or distributed database, or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

In alternative examples, dedicated hardware implementations, such as application specific integrated circuits, programmable logic arrays and other hardware devices, may be constructed to implement various aspects of the system. One or more examples described may implement functions using two or more specific interconnected hardware modules or devices with related control and data signals that can be communicated between and through modules, or as portions of an application-specific integrated circuit. The system may encompass software, firmware, and hardware implementations.

The system described may be implemented by software programs executable by a computer system. Implementations can include distributed processing, component/object distributed processing, and parallel processing. Alternatively, virtual computer system processing can be constructed to implement various aspects of the system.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. An emergency communications system, comprising:
   a primary battery;
   an emergency communications control unit electrically and mechanically connected to the primary battery; and
   a mounting device configurable to mount the emergency communications control unit within a close distance of the primary battery, the mounting device including a telescopic structure for adjustment of a distance between the emergency communications control unit and the primary battery,
   where a back-up battery for powering the emergency communications control unit is not included,
   where the telescopic structure comprises at least one channel,
   where a power supply cable electrically coupling the emergency communications control unit to the primary battery is housed in the at least one channel of the telescopic structure,
   where the emergency communications control unit is mounted on the telescopic structure,
   where the primary battery is a starter battery of a vehicle, and
   where the close distance is a distance equal to or less than twenty centimeters.

2. The system of claim 1, where the primary battery and the emergency communications control unit are embedded in or on a substrate.

3. The system of claim 1, further comprising one or more sensors configurable to detect a triggering event.

4. The system of claim 3, where the triggering event includes one or more of inflation of an airbag, a determined amount of deceleration, vehicle rollover, or a determined temperature increase or decrease within a vehicle.

5. The system of claim 1, where the emergency communications control unit includes an interface configurable to connect to one or more vehicle communications interfaces configurable to transmit emergency communications, the emergency communications including a first data set and a second data set, the first data set and the second data set being sent in different formats over different networks and information transmission protocols.

6. An automotive emergency communications system configurable to install in a vehicle, comprising:
   a starter battery connector configurable to electrically and mechanically connect to a vehicle starter battery;
   an emergency communications control unit communicatively coupled to the starter battery connector; and
   a mounting device configurable to mount the emergency communications control unit within a close distance to the vehicle starter battery, the mounting device including an adjustment structure for adjusting a distance between the emergency communications control unit and the vehicle starter battery,
   where a back-up battery for powering the emergency communications control unit is not included,
   where the adjustment structure comprises at least one channel,
   where a power supply cable electrically coupling the emergency communications control unit to the vehicle starter battery is housed in the at least one channel of the adjustment structure,
   where the emergency communications control unit is attached to the adjustment structure by a fastening device,
   where the close distance is a distance equal to or less than twenty centimeters.

7. The system of claim 6, where the emergency communications control unit is configurable to install in a passenger compartment of the vehicle.

8. The system of claim 7, where the passenger compartment is a glove compartment.

9. The system of claim 6, where the emergency communications control unit is configurable to install in a vehicle cabin.

10. The system of claim 6, where the emergency communications control unit is configurable to install in an engine compartment of the vehicle.

11. The system of claim 6, further comprising one or more sensors configurable to detect a triggering event and send a message to the emergency communications control unit regarding the triggering event.

12. The system of claim 11, where the triggering event includes one or more of inflation of an airbag, a determined amount of deceleration, rollover, or a determined temperature increase or decrease within the vehicle.

13. The system of claim 6, where the adjustment structure is attached to the vehicle starter battery by a further fastening device.

14. A mounting device, comprising:
   a mechanism operable to couple, mechanically and electrically, an emergency communications control unit with a primary battery installed in a vehicle;
   a channel; and
   one or more movable guiding tracks,
   where the coupling between the emergency communications control unit and the primary battery is within a close distance,
   where a back-up battery for powering the emergency communications control unit is not included,
   where a power supply cable electrically coupling the emergency communications control unit to the primary battery is housed in the channel of the mounting device,
   where the one or more movable guiding tracks are configured to support the emergency communications control unit,
   where the mechanism includes a telescopic structure for adjustment of a distance between the emergency communications control unit and the primary battery, and
   where the power supply cable is housed in a channel of the telescopic structure,
   where the primary battery is a starter battery of the vehicle, and
   where the close distance is a distance equal to or less than twenty centimeters.

15. The mounting device of claim 14, where the close distance is a distance equal to or less than ten centimeters.

16. The mounting device of claim 14, further comprising a mechanism configurable to install the emergency communications control unit in an engine compartment of a vehicle.

* * * * *

UNITED STATES PATENT AND TRADEMARK OFFICE
CERTIFICATE OF CORRECTION

PATENT NO. : 9,628,972 B2
APPLICATION NO. : 13/863214
DATED : April 18, 2017
INVENTOR(S) : Thomas Gerdes It is certified that error appears in the above-identified patent and that said Letters Patent is hereby corrected as shown below:

On the Title Page

In item (73) in the assignee section, please delete "Harman International Industries, Incorporated, Stamford, CT (US)" and replace with "Harman Becker Automotive Systems GmbH, Karlsbad, DE".

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*